(12) United States Patent
Wu et al.

(10) Patent No.: US 12,260,056 B2
(45) Date of Patent: Mar. 25, 2025

(54) DEVICE AND METHOD FOR DETECTION

(71) Applicant: HTC Corporation, Taoyuan (TW)

(72) Inventors: Chun-Yih Wu, Taoyuan (TW);
Ta-Chun Pu, Taoyuan (TW);
Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/505,291

(22) Filed: Nov. 9, 2023

(65) Prior Publication Data
US 2024/0264708 A1 Aug. 8, 2024

Related U.S. Application Data

(60) Provisional application No. 63/443,452, filed on Feb. 6, 2023.

(30) Foreign Application Priority Data

Oct. 6, 2023 (TW) .................................. 112138506

(51) Int. Cl.
*G06F 3/044* (2006.01)
*G01S 13/89* (2006.01)
*G06F 3/01* (2006.01)

(52) U.S. Cl.
CPC ............ *G06F 3/0446* (2019.05); *G01S 13/89* (2013.01); *G06F 3/011* (2013.01)

(58) Field of Classification Search
CPC ............. G01S 13/89; G06F 3/011–015; G06F 3/044–0448
See application file for complete search history.

(56) References Cited

U.S. PATENT DOCUMENTS

| | | | |
|---|---|---|---|
| 2012/0228499 A1* | 9/2012 | Koyanagi | G03B 42/04 250/336.1 |
| 2020/0037443 A1* | 1/2020 | Matsuda | B32B 38/10 |
| 2021/0143539 A1* | 5/2021 | Yuan | B32B 27/288 |
| 2021/0151870 A1 | 5/2021 | Kuo et al. | |
| 2021/0232228 A1* | 7/2021 | Nguyen | G06F 3/017 |
| 2022/0171455 A1* | 6/2022 | Kim | G06T 19/00 |

* cited by examiner

*Primary Examiner* — Hang Lin
(74) *Attorney, Agent, or Firm* — Birch, Stewart, Kolasch & Birch, LLP

(57) ABSTRACT

A detection device includes a plurality of capacitive sensors, a transmission antenna, a reception antenna, a radar module, a carrier module, and a processor. The capacitive sensors detect first information of a human body portion in a first direction, and detect second information of the human body portion in a second direction. The radar module uses the transmission antenna to transmit a radar signal to the human body portion. The radar module uses the reception antenna to receive a reflection signal from the human body portion. The radar module detects third information of the human body portion in a third direction according to the reflection signal. The capacitive sensors, the transmission antenna, and the reception antenna are disposed on the carrier element. The processor estimates status information of the human body portion according to the first information, the second information, and the third information.

18 Claims, 4 Drawing Sheets

DEVICE AND METHOD FOR DETECTION

CROSS REFERENCE TO RELATED APPLICATIONS

This application claims the benefit of U.S. Provisional Application No. 63/443,452, filed on Feb. 6, 2023, and also claims priority of Taiwan patent Application No. 112138506 filed on Oct. 6, 2023, the entirety of which is incorporated by reference herein.

BACKGROUND OF THE INVENTION

Field of the Invention

The invention relates to a detection device, and more particularly, to a detection device and a detection method.

Description of the Related Art

Capacitive sense pads are commonly used detection components. However, when applied in the field of VR (Virtual Reality) or AR (Augmented Reality), the applications for conventional capacitive sense pads are relatively limited, and this may degrade the overall detection accuracy. Accordingly, there is a need to propose a novel solution for solving the problem of the prior art.

BRIEF SUMMARY OF THE INVENTION

In an exemplary embodiment, the invention is directed to a detection device for detecting a human body portion. The detection device includes a plurality of capacitive sensors, a transmission antenna, a reception antenna, a radar module, a carrier module, and a processor. The capacitive sensors detect first information of the human body portion in a first direction, and detect second information of the human body portion in a second direction. The radar module uses the transmission antenna to transmit a radar signal to the human body portion. The radar module uses the reception antenna to receive a reflection signal from the human body portion. The radar module detects third information of the human body portion in a third direction according to the reflection signal. The capacitive sensors, the transmission antenna, and the reception antenna are all disposed on the carrier element. The processor estimates status information of the human body portion according to the first information, the second information, and the third information.

In some embodiments, the human body portion is a finger of a user.

In some embodiments, the detection device is implemented on a VR (Virtual Reality) controller or an AR (Augmented Reality) controller.

In some embodiments, the first direction, the second direction, and the third direction are perpendicular to each other.

In some embodiments, each of the first information and the second information is position information.

In some embodiments, the third information is position and velocity information.

In some embodiments, the capacitive sensors, the transmission antenna, and the reception antenna do not overlap with each other.

In some embodiments, the carrier element is a multilayer circuit board.

In some embodiments, the status information is relative to a 3D (Three-Dimensional) image of the human body portion.

In some embodiments, the detection device further includes an antenna cover for covering the transmission antenna and the reception antenna.

In some embodiments, the antenna cover has an operational frequency band from 55 GHz to 140 GHz.

In some embodiments, the antenna cover includes a conductive layer and a nonconductive housing, and the conductive layer is disposed on the nonconductive housing.

In some embodiments, the conductive layer includes a signal radiation region and a signal cut-off region, and the signal radiation region is adjacent to the transmission antenna and the reception antenna.

In some embodiments, the signal radiation region is surrounded by the signal cut-off region.

In some embodiments, a plurality of slots are formed and periodically arranged in the signal radiation region of the conductive layer.

In some embodiments, the length of each of the slots is substantially equal to 0.5 wavelength of the operational frequency band.

In some embodiments, the width of each of the slots is shorter than or equal to 0.1 wavelength of the operational frequency band.

In some embodiments, a plurality of openings are formed and periodically arranged in the signal cut-off region of the conductive layer.

In some embodiments, the length or the width of each of the openings is from 0.1 to 0.2 wavelength of the operational frequency band.

In another exemplary embodiment, the invention is directed to a detection method that includes the following steps. A plurality of capacitive sensors are used to detect first information of a human body portion in a first direction. The capacitive sensors are used to detect second information of the human body portion in a second direction. A transmission antenna is used to transmit a radar signal to the human body portion. A reflection signal from the human body portion is received by a reception antenna. A radar module is used to detect third information of the human body portion in a third direction according to the reflection signal. A processor is used to estimate the status information of the human body portion according to the first information, the second information, and the third information. The capacitive sensors, the transmission antenna, and the reception antenna are all disposed on a carrier element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
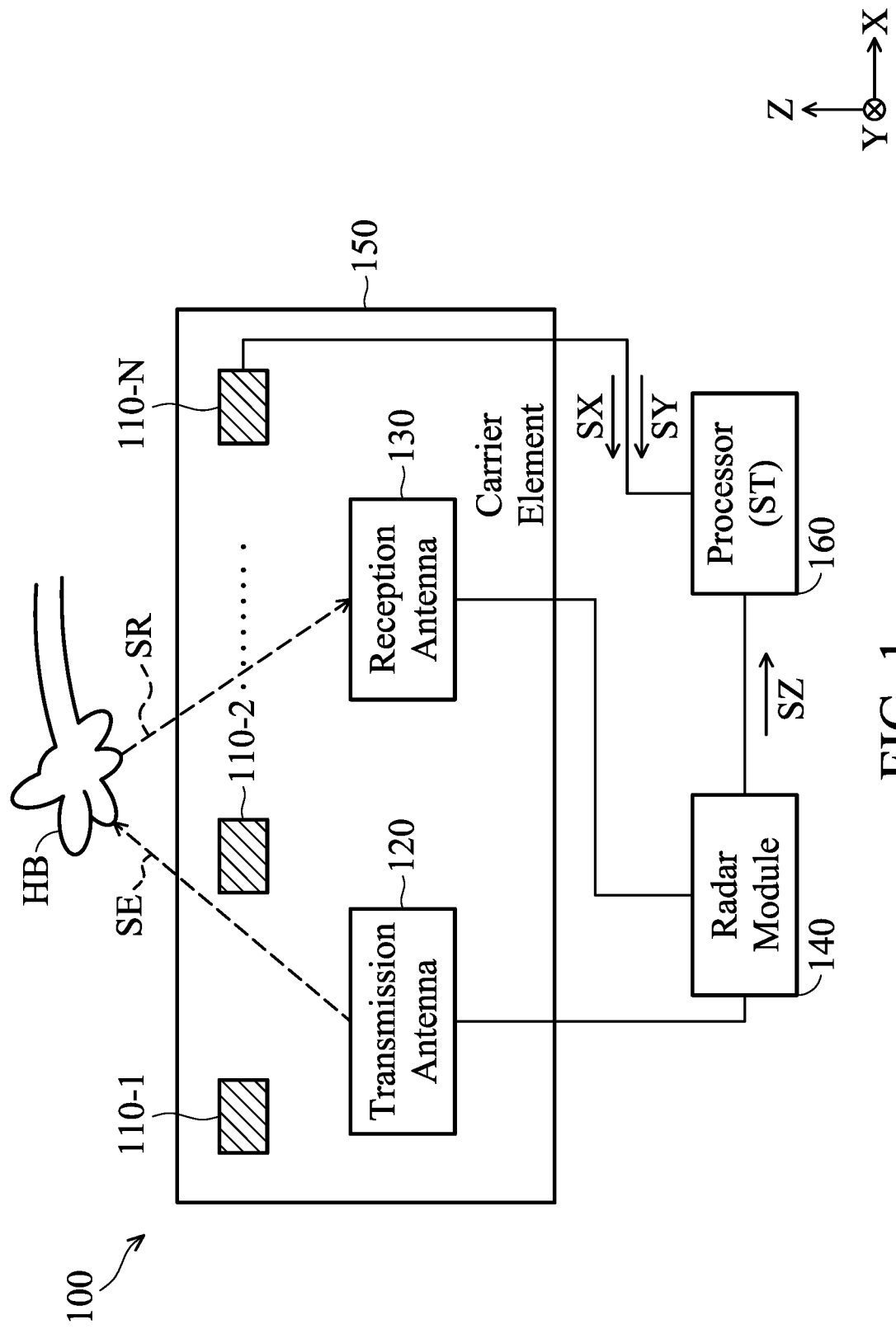
FIG. 1 is a diagram of a detection device according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a detection device 100 according to an embodiment of the invention. For example, the detection device 100 may be applied to the field of VR (Virtual Reality) or AR (Augmented Reality), but it is not limited thereto. In the embodiment of FIG. 1, the detection device 100 includes a plurality of capacitive sensors 110-1, 110-2, . . . , and 110-N, a transmission antenna 120, a reception antenna 130, a radar module 140, a carrier module 150, and a processor 160, where "N" is any integer greater than or equal to 2. It should be understood that the detection device 100 may further include other components, such as a housing, a speaker, and/or a power supply module, although they are not displayed in FIG. 1.

In some embodiments, the detection device 100 is configured to detect a human body portion HB. For example, the human body portion HB may be any finger of a user, but it is not limited thereto.

The capacitive sensors 110-1, 110-2, . . . , and 110-N can detect first information SX of the human body portion HB in a first direction, and also detect second information SY of the human body portion HB in a second direction. The first direction and the second direction may be perpendicular to each other. In some embodiments, each of the first information SX and the second information SY may position information. For example, the first information SX may include a plurality of X-axis positions of the human body portion HB, and the second information SY may include a plurality of Y-axis positions of the human body portion HB, but they are not limited thereto. It should be understood that because the human body portion HB occupies a certain volume in space, its X-axis positions and its Y-axis positions each have a specific range.

The shapes and types of the transmission antenna 120 and the reception antenna 130 are not limited in the invention. For example, any of the transmission antenna 120 and the reception antenna 130 may be a patch antenna, a monopole antenna, a dipole antenna, a loop antenna, a PIFA (Planar Inverted F Antenna), or a chip antenna.

The radar module 140 is coupled to the transmission antenna 120 and the reception antenna 130. Specifically, the radar module 140 can use the transmission antenna 120 to transmit a radar signal SE to the human body portion HB, and also use the reception antenna 130 to receive a reflection signal SR from the human body portion HB. Next, the radar module 140 can detect third information SZ of the human body portion HB in a third direction according to the reflection signal SR. The third direction may be perpendicular to both of the aforementioned first direction and the second direction. In some embodiments, the third information SZ is position and velocity information. For example, the third information SZ may include a plurality of Z-axis positions and a Z-axis velocity of the human body portion HB, but it is not limited thereto.

In some embodiments, the aforementioned first direction is equivalent to the X-axis direction, the aforementioned second direction is equivalent to the Y-axis direction, and the aforementioned third direction is equivalent to the Z-axis direction. The X-axis direction, the Y-axis direction, and the Z-axis direction may be perpendicular to each other. Furthermore, the aforementioned first direction and second direction may be considered as horizontal directions, and the aforementioned third direction may be considered as a vertical direction.

The capacitive sensors 110-1, 110-2, . . . , and 110-N, the transmission antenna 120, and the reception antenna 130 are all disposed on the carrier element 150. For example, the carrier element 150 may be a multilayer circuit board. In some embodiments, the capacitive sensors 110-1, 110-2, . . . , and 110-N, the transmission antenna 120, and the reception antenna 130 are disposed on the same layer of the multilayer circuit board. However, the invention is not limited thereto. In alternative embodiments, the capacitive sensors 110-1, 110-2, . . . , and 110-N, the transmission antenna 120, and the reception antenna 130 are disposed on different layers of the multilayer circuit board.

The processor 160 is coupled to the capacitive sensors 110-1, 110-2, . . . , and 110-N, so as to receive the first information SX and the second information SY. The processor 160 is also coupled to the radar module 140, so as to receive the third information SZ. Then, the processor 160 can estimate status information ST of the human body portion HB according to the first information SX, the second information SY, and the third information SZ. In some embodiments, the status information ST is relative to a 3D (Three-Dimensional) image of the human body portion HB, but it is not limited thereto. For example, if the human body portion HB is one or more fingers of the user, the estimated status information ST of the processor 160 may include a gesture image of the human body portion HB.

With the design of the invention, the proposed detection device 100 can perform a dual-detection process on the human body portion HB by using the capacitive sensors 110-1, 110-2, . . . , and 110-N and the radar module 140 concurrently. Besides the information in the horizontal directions, the overall detection accuracy of the dual-detection process of the detection device 100 can be significantly enhanced since the radar module 140 provides additional information in the vertical direction.

The following embodiments will introduce different configurations and detail the structural features of the detection device 100. It should be understood that these figures and descriptions are merely exemplary, rather than limitations of the invention.

Figure 2:
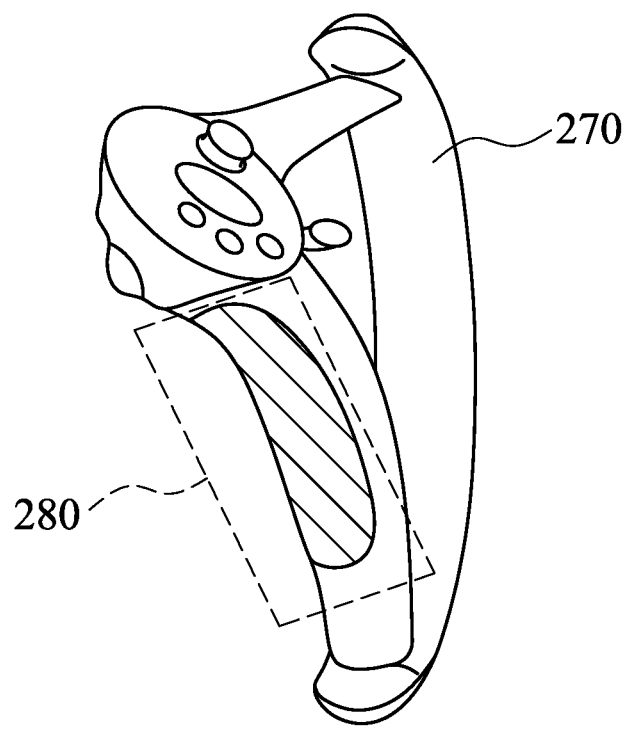
FIG. 2 is a diagram of a controller according to an embodiment of the invention.

FIG. 2 is a diagram of a controller 270 according to an embodiment of the invention. The aforementioned detection device 100 may be implemented on the controller 270. For example, the controller 270 may be a VR controller or an AR controller. In the embodiment of FIG. 2, the aforementioned detection device 100 is disposed at a handle portion 280 of the controller 270, but it is not limited thereto.

Figure 3:
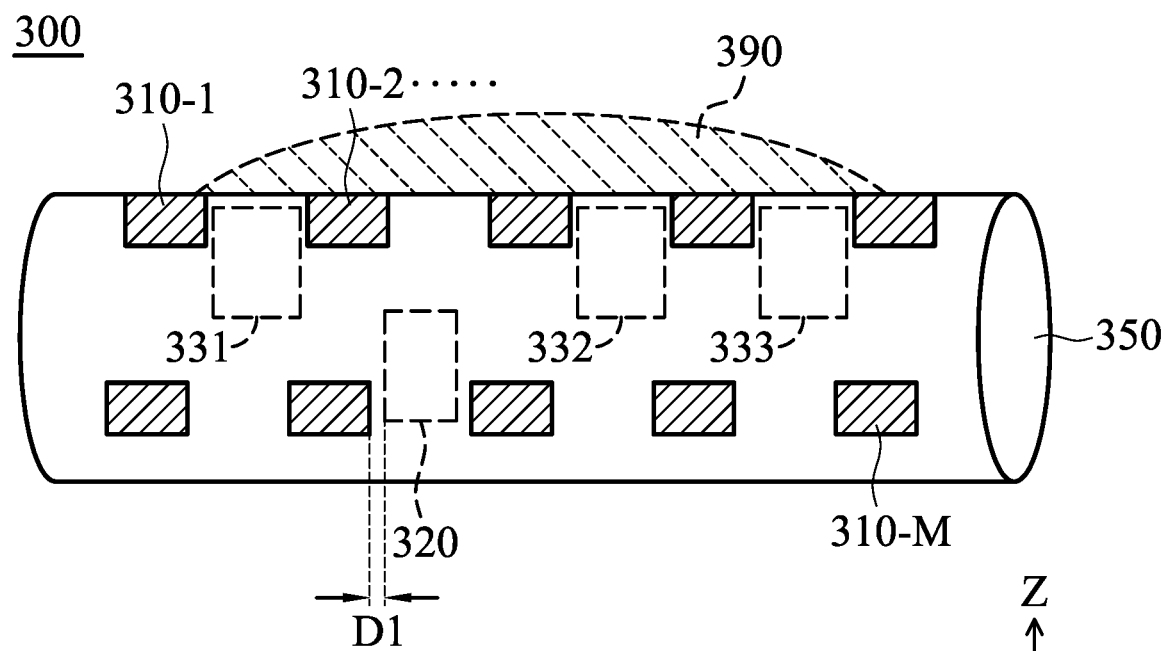
FIG. 3 is a diagram of a detection device according to an embodiment of the invention.

FIG. 3 is a diagram of a detection device 300 according to an embodiment of the invention. FIG. 3 is similar to FIG. 1. In the embodiment of FIG. 3, the detection device 300 at least includes a plurality of capacitive sensors 310-1, 310-2, . . . , and 310-M, a transmission antenna 320, a plurality of reception antennas 331, 332 and 333, and a carrier module 350, where "M" is any integer greater than or equal to 2. Generally, the transmission antenna 320 and the reception antennas 331, 332 and 333 are interleaved with the capacitive sensors 310-1, 310-2, . . . , and 310-M on the carrier element 350. It should be noted that in order to improve the detection accuracy of the detection device 300, the capacitive sensors 310-1, 310-2, . . . , and 310-M, the transmission antenna 320, and the reception antennas 331, 332 and 333 do not overlap with each other. With such a design, the detection device 300 can provide a radar sense zone 390, so as to effectively detect a human body portion (not shown). Similarly, the radar sense zone 390 not only corresponds to the X-axis direction and the Y-axis direction but also corresponds to the Z-axis direction. In some embodiments, the distance D1 between any two adjacent elements of the capacitive sensors 310-1, 310-2, . . . , and 310-M, the transmission antenna 320, and the reception antennas 331, 332 and 333 may be longer than or equal to 0.5 mm. Other features of the detection device 300 of FIG. 3 are similar to those of the detection device 100 of FIG. 1. Accordingly, the two embodiments can achieve similar levels of performance.

Figure 4:
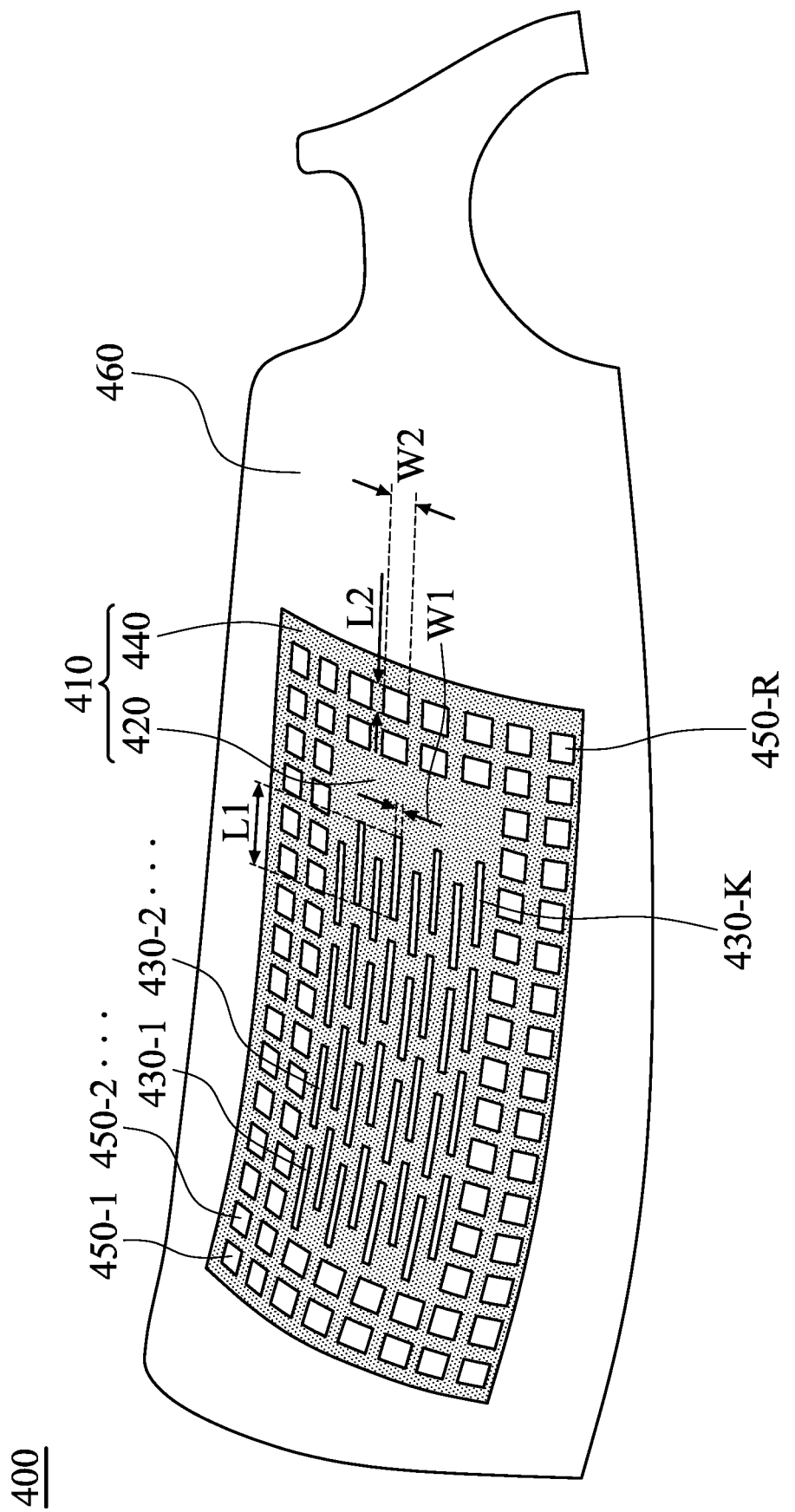
FIG. 4 is a diagram of an antenna cover according to an embodiment of the invention.

FIG. 4 is a diagram of an antenna cover 400 according to an embodiment of the invention. For example, the aforementioned detection device 100 (or 300) may further include an antenna cover 400. The antenna cover 400 is configured to cover the transmission antenna 120 (or 320) and the reception antenna 130 (or 331, 332 and 333). In some embodiments, the antenna cover 400 has an operational frequency band from 55 GHz to 140 GHz. Generally, the incorporation of the antenna cover 400 can limit a radar radiation range, so as to reduce the probability of the radar module 140 misjudging the detection result of the human body portion HB.

In the embodiment of FIG. 4, the antenna cover 400 includes a conductive layer 410 and a nonconductive housing 460. The conductive layer 410 is disposed on the nonconductive housing 460. Specifically, the conductive layer 410 includes a signal radiation region 420 and a signal cut-off region 440. The signal radiation region 420 is adjacent to the aforementioned transmission antenna 120 (or 320) and the aforementioned reception antenna 130 (or 331, 332 and 333). For example, the signal radiation region 420 may be completely surrounded by the signal cut-off region 440, but they are not limited thereto. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

Specifically, a plurality of slots 430-1, 430-2, . . . , and 430-K are formed and periodically arranged in the signal radiation region 420 of the conductive layer 410, where "K" is any integer greater than or equal to 2. For example, each slot may substantially have a straight-line shape, but it is not limited thereto. In some embodiments, the length L1 of each of the slots 430-1, 430-2, . . . , and 430-K is substantially equal to 0.5 wavelength (0.5λ) of the operational frequency band of the antenna cover 400, and the width W1 of each of the slots 430-1, 430-2, . . . , and 430-K is shorter than or equal to 0.1 wavelength (0.1λ) of the operational frequency band of the antenna cover 400. According to practical measurements, the ranges of the length L1 and the width W1 can help to maximize the corresponding radiation performance within the signal radiation region 420. In other words, the relative electromagnetic waves can be transmitted through the signal radiation region 420 of the conductive layer 410.

In addition, a plurality of openings 450-1, 450-2, . . . , and 450-R are formed and periodically arranged in the signal cut-off region 440 of the conductive layer 410, where "R" is any integer greater than or equal to 2. For example, each opening may substantially have a square shape, but it is not limited thereto. In some embodiments, the length L2 or the width W2 of each of the openings 450-1, 450-2, . . . , and 450-R is from 0.1 to 0.2 wavelength (0.1λ~0.2λ) of the operational frequency band of the antenna cover 400. According to practical measurements, the ranges of the length L2 and the width W2 can help to minimize the corresponding radiation performance within the signal cut-off region 440. In other words, the relative electromagnetic waves cannot be transmitted through the signal cut-off region 440 of the conductive layer 410. It should be noted that the relative parameters are merely used to represent the corresponding designs of "pass-band" and "stop-band". In some embodiments, a central region of the conductive layer 410 is substantially equivalent to the aforementioned pass-band, and an edge region of the conductive layer 410 is substantially equivalent to the aforementioned stop-band. In alternative embodiments, the conductive layer 410 is implemented with another structure having more layers, but its relative parameters will not be described again herein.

Figure 5:
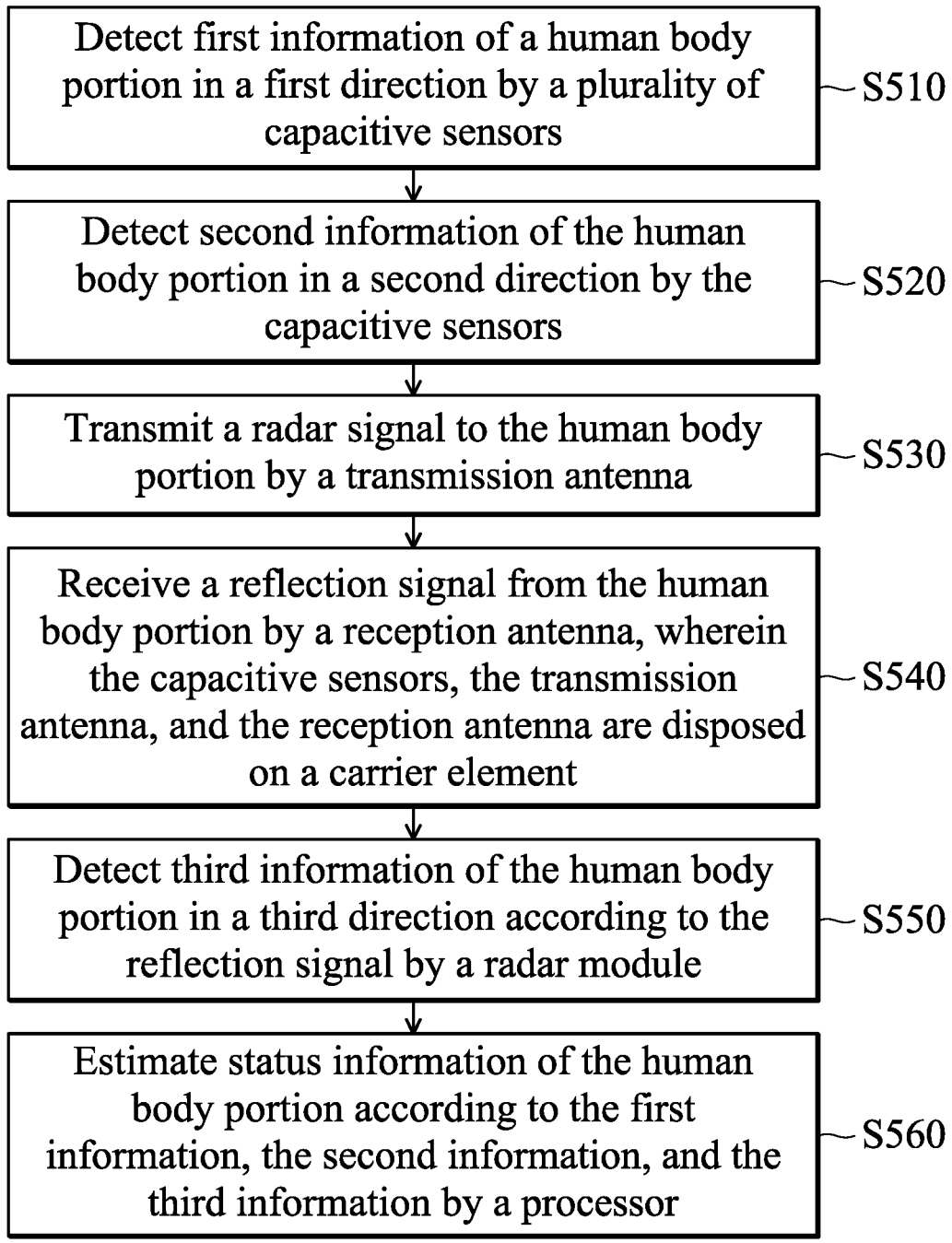
FIG. 5 is a flowchart of a detection method according to an embodiment of the invention.

FIG. 5 is a flowchart of a detection method according to an embodiment of the invention. To begin, in step S510, first information of a human body portion in a first direction is detected by a plurality of capacitive sensors. In step S520, second information of the human body portion in a second direction is detected by the capacitive sensors. In step S530, a radar signal is transmitted to the human body portion by a transmission antenna. In step S540, a reflection signal is received from the human body portion by a reception antenna. The capacitive sensors, the transmission antenna, and the reception antenna are all disposed on a carrier element. In step S550, third information of the human body portion in a third direction is detected according to the reflection signal by a radar module. Finally, in step S560, status information of the human body portion is estimated according to the first information, the second information, and the third information by a processor. It should be understood that these steps are not required to be performed in order, and every feature of the embodiments of FIGS. 1 to 4 may be applied to the detection method of FIG. 5.

The invention proposed a novel detection device and a novel detection method. In comparison to the conventional design, the invention has at least the advantages of enhancing the overall detection accuracy and reducing the whole manufacturing cost. Therefore, the invention is suitable for application in a variety of devices.

Note that the above element parameters are not limitations of the invention. A designer can fine-tune these setting values according to different requirements. It should be understood that the detection device and detection method of the invention are not limited to the configurations of FIGS. 1-5. The invention may include any one or more features of any one or more embodiments of FIGS. 1-5. In other words, not all of the features displayed in the figures should be implemented in the detection device and detection method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A detection device for detecting a human body portion, comprising:
   a plurality of capacitive sensors, detecting first information of the human body portion in a first direction, and detecting second information of the human body portion in a second direction;
   a transmission antenna;
   a reception antenna;
   a radar module, using the transmission antenna to transmit a radar signal to the human body portion, and using the reception antenna to receive a reflection signal from the human body portion, wherein the radar module detects third information of the human body portion in a third direction according to the reflection signal;
   a carrier element, wherein the capacitive sensors, the transmission antenna, and the reception antenna are disposed on the carrier element;
   a processor, estimating status information of the human body portion according to the first information, the second information, and the third information; and
   an antenna cover, covering the transmission antenna and the reception antenna;
   wherein the antenna cover comprises a conductive layer and a nonconductive housing;
   wherein the conductive layer comprises a signal radiation region and a signal cut-off region;
   wherein a plurality of slots are formed and periodically arranged in the signal radiation region of the conductive layer.

2. The detection device as claimed in claim 1, wherein the human body portion is a finger of a user.

3. The detection device as claimed in claim 1, wherein the detection device is implemented on a VR (Virtual Reality) controller or an AR (Augmented Reality) controller.

4. The detection device as claimed in claim 1, wherein the first direction, the second direction, and the third direction are perpendicular to each other.

5. The detection device as claimed in claim 1, wherein each of the first information and the second information is position information.

6. The detection device as claimed in claim 1, wherein the third information is position and velocity information.

7. The detection device as claimed in claim 1, wherein the capacitive sensors, the transmission antenna, and the reception antenna do not overlap with each other.

8. The detection device as claimed in claim 1, wherein the carrier element is a multilayer circuit board.

9. The detection device as claimed in claim 1, wherein the status information is relative to a 3D (Three-Dimensional) image of the human body portion.

10. The detection device as claimed in claim 1, wherein the antenna cover has an operational frequency band from 55 GHz to 140 GHz.

11. The detection device as claimed in claim 10, wherein the conductive layer is disposed on the nonconductive housing.

12. The detection device as claimed in claim 11, wherein the signal radiation region is adjacent to the transmission antenna and the reception antenna.

13. The detection device as claimed in claim 12, wherein the signal radiation region is surrounded by the signal cut-off region.

14. The detection device as claimed in claim 12, wherein a length of each of the slots is substantially equal to 0.5 wavelength of the operational frequency band.

15. The detection device as claimed in claim 12, wherein a width of each of the slots is shorter than or equal to 0.1 wavelength of the operational frequency band.

16. The detection device as claimed in claim 12, wherein a plurality of openings are formed and periodically arranged in the signal cut-off region of the conductive layer.

17. The detection device as claimed in claim 16, wherein a length or a width of each of the openings is from 0.1 to 0.2 wavelength of the operational frequency band.

18. A detection method, comprising the steps of:
- detecting first information of a human body portion in a first direction by a plurality of capacitive sensors;
- detecting second information of the human body portion in a second direction by the capacitive sensors;
- transmitting a radar signal to the human body portion by a transmission antenna;
- receiving a reflection signal from the human body portion by a reception antenna;
- covering the transmission antenna and the reception antenna by an antenna cover, wherein the antenna cover comprises a conductive layer and a nonconductive housing, the conductive layer comprises a signal radiation region and a signal cut-off region, and a plurality of slots are formed and periodically arranged in the signal radiation region of the conductive layer;
- detecting third information of the human body portion in a third direction according to the reflection signal by a radar module; and
- estimating status information of the human body portion according to the first information, the second information, and the third information by a processor;
- wherein the capacitive sensors, the transmission antenna, and the reception antenna are disposed on a carrier element.

* * * * *